Patented May 28, 1929.

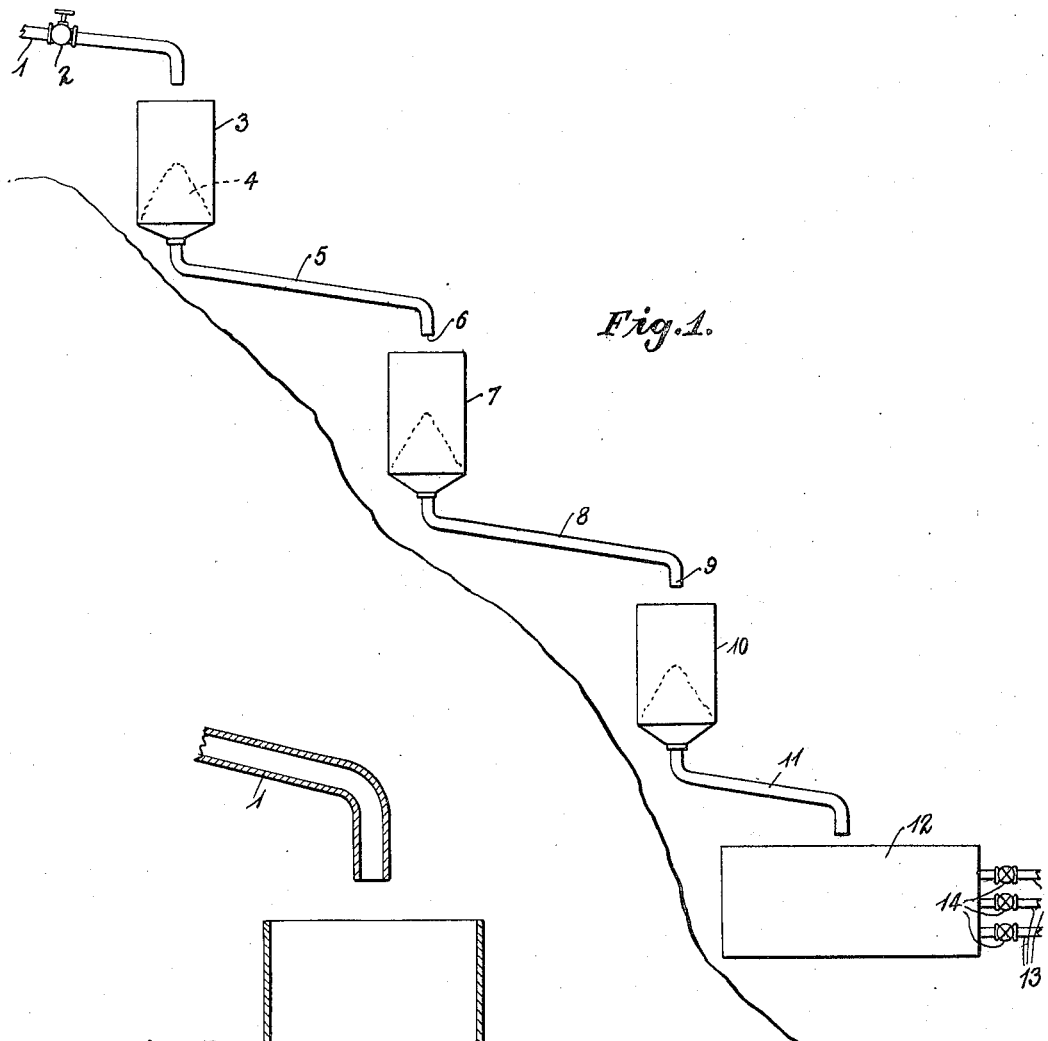

1,714,828

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

PROCESS AND APPARATUS FOR TREATING ACIDIFIED MINE WATER.

Application filed July 9, 1928. Serial No. 293,294.

This invention relates to a process and apparatus for treating polluted acid wastes such as the acidified liquids emitted from mines. These acidified waste waters are extremely deadly to aquatic life and seriously pollute any stream or body of water into which they may be discharged. Such liquids are furthermore destructive to apparatus used in the handling thereof and frequently render the normal fresh water supply into which they are discharged unsuitable for municipal use or even as a supply for steam boilers. These liquids also produce a corrosive action on concrete dams, abutments and upon iron or steel constructions with which they may contact.

The present invention comprehends a process for the subjection of these polluted acid waters to a treatment which will render the same sufficiently pure to permit their discharge into any stream or body of water without danger to aquatic life and without placing any substantial burden on the stream due to the oxygen demand of the liquid.

The chief polluting constituents of acidified mine waters are sulphuric acid and the metallic salts, usually salts of iron. The iron salts produce a red discoloration of the stream water and the acid kills the fish life in the stream into which these waste waters are discharged. The metallic salts may, if in sufficient concentration, also be detrimental to fish life.

Where such acidified mine waters accumulate and stand for a substantial period a material change in their character is noticeable. This is due to the oxidation of the iron salts which constantly takes place with the formation of ferric salts which hydrolyze, forming ferric hydrate and sulphuric acid. The ferric salts formed undergo a partial hydrolysis. The ferrous sulphate is formed by oxidation of iron pyrites as $$FeS_2 + H_2O + 7O = FeSO_4 + H_2SO_4$$

The iron pyrites contain more sulphur than is necessary to balance the iron when oxidized. Therefore, the sulphuric acid is formed.

The reaction for the oxidization of the ferrous sulphate to ferric sulphate is as follows:

$$4FeSO_4 + 2H_2SO_4 + O_2 = 2Fe_2(SO_4)_3 + 2H_2O$$

The ferric sulphate hydrolyzes as follows:—

$$Fe_2(SO_4)_3 + 6H_2O = 2Fe(OH)_3 + 3H_2SO_4$$

The ferric hydrate formed as above indicated causes a discoloration of the stream into which the mine water is discharged and tends to use up the dissolved oxygen content of the stream in the oxidation of the ferrous salts to the point of saturation of ferrous iron. It is, therefore, desirable and a feature of my process, to remove this constituent from the mine water.

I am aware that a great many processes have been devised for the treatment of acidified mine waters, many of which contemplate the passage of the mine water through limestone for the purpose of effecting a neutralization of the acid content thereof. I have found, however, that it is impossible to effect neutralization of the acid content of mine water by the use of limestone beds for any practical period of time. The density and hardness of the limestone is such that it becomes immediately coated with the iron salts, which precipitate during neutralization of the acid content of the mine water. As soon as the limestone becomes coated with such iron salts, it is in effect insulated from further contact with the mine water and consequently can no longer effect a neutralization thereof. I have determined that a less dense neutralizing agent in the form of porous calcium carbonate, such as travertine, is far superior for the neutralization of mine water to limestone or other neutralizing agents hereinbefore employed. I have determined, however, that even in the use of travertine the iron salts will deposit upon the surface and within the pores thereof to such an extent that after a comparatively brief period of use, the effectiveness of the travertine as a neutralizing agent is greatly depreciated.

The present invention relates to the provision of a process by which travertine may be employed as a neutralizing agent for the acid content of the mine water and its effectiveness maintained at high degree of efficiency over a prolonged time period.

It is a more specific object of the invention to so control the flow of the mine water as to cause the same to move in a plurality of successive water falls and to forcefully contact in each fall with a body of travertine, the forceful impact of the water with the travertine being sufficient to in each instance cause a continuous erosive action on the travertine, greatly increasing the rate of solution of the calcium carbonate contained in the travertine and increasing the rate of neutralization of the acid. The force of the water also keeps the surface of the travertine free from any deposit of iron salts which might tend to insulate the travertine from intimate contact with the mine water.

To the end that my invention may be the better understood, reference is now made to the apparatus shown in the accompanying drawing forming a part of this specification.

Figure 1 is a diagrammatic view in side elevation of the apparatus, and

Figure 2 is a detail sectional view through one of the treating chambers.

Referring to the drawings, the acidified mine water containing the iron salts, is supplied to the apparatus through the line 1 controlled by the valve 2 and caused to have its initial fall as it drops from the outlet of the line 1 into the primary treating chamber 3. The base of the chamber is filled with porous calcium carbonate in the form of lumps of travertine 4. The travertine is preferably arranged in the chamber so that it is in the shape of a cone or pyramid, the mine water falling on the travertine at or adjacent the apex of the cone or pyramid. The degree of fall of the mine water will be varied depending upon the volume of flow and the precise character of the travertine employed. I find, however, in actual practice that the mine water should never fall for a distance less than five feet. The gravity or hydrostatic head pressure created by the falling water should be such as to effect an erosive action on the surface of the travertine and to keep the same washed free from any accumulation of iron salts which tend to adhere to the surface thereof.

From the preliminary treating chamber 3 the mine water subsequent to its passage through the travertine body 4, is caused to flow through the line 5 and to again fall from the discharge end 6 of the line 5 into the next succeeding treating chamber 7, which is in all respects a duplicate of the chamber 3. The mine water from the chamber 7 passes through the line 8, falling from the discharge end of the line 8 indicated at 9, into the treating chamber 10. It will be understood that a sufficient number of treating chambers and water falls will be employed to insure complete neutralization of the acid content of the mine water.

The mine water leaves the last treating chamber 10 through the line 11 and is discharged into the enlarged settling zone 12 wherein it is permitted to assume a quiescent state to permit the ferric iron salts to hydrolyze and the settling out from the water of the products of such hydrolysis.

The supernatent liquor may be drawn off from the settling zone 12 through any one of the vertically spaced draw-off lines 13 controlled by the valves 14 and is in condition to be discharged into the receiving stream. It will, of course, be appreciated that a plurality of settling zones 12 may be provided and used alternately if desired.

It will be appreciated that the erosive action on the travertine created by the force of the falling water will materially increase the rate of solution of the calcium carbonate and consequently increase the speed of neutralization of the acid. This is important inasmuch as this feature enables a rapid treatment of the water without necessitating its retention in the treating chambers. The force of the falling water also causes the same to penetrate the pores and cells of the travertine, further assisting in the neutralization of the acid content. As the falling water is deflected over the surface of the travertine it becomes quickly saturated with atmospheric oxygen which is consumed by the oxidation of the ferric iron. The operation effects a very efficient aeration of the mine water and a large portion of the ferrous iron content is thereby oxidized.

If desirable, suitable man holes (not shown) may be provided at the base of the several treating chambers 3, 7 and 10 to facilitate the removal of spent travertine therefrom. The spent travertine may be removed a small quantity at a time and the new charges added in like manner so that the most efficient portion of the travertine will always be positioned at the apex of the conical body thereof with which the water first contacts.

The following constitutes an analysis of the typical mine water such as the process is designed to treat:

| | | |
|---|---|---|
| Acidity as $H_2SO_4$ | 1127 | P. P. M. |
| Iron as ferrous sulphate | 960 | P. P. M. |
| Sulphur as $SO_4$ | 936 | P. P. M. |
| Sul. unoxidized | 17.8 | P. P. M. |
| Oxygen demand | 50.5 | P. P. M. |
| Dilution necessary | 10 to 1 | |

This analysis is merely illustrative since, as heretofore stated, the waste will vary widely.

By treating mine water of this character in accordance with the process hereinbefore described, the acid content thereof can be completely neutralized and by providing the necessary settling period, the iron content can be reduced to a negligible quantity.

The final effluent can be introduced to any receiving stream or body of water without danger or pollution thereof.

I desire it understood that this disclosure is merely illustrative and that I contemplate within the scope of the invention such changes and modifications as may be necessary to adapt the same to various local conditions.

I claim:—

1. A process for treating acidified mine water comprising causing the same to forcefully impact with and pass through each of a plurality of successive bodies of travertine.

2. A process for treating acidified mine water comprising causing the same to forcefully impact with and pass through each of a plurality of successive bodies of travertine, the force of said impact being adequate to effect a continuous eroding action at the surface of the travertine and prevent the accumulation of insulating iron salts thereon.

3. A process for treating acidified mine water comprising causing the same to forefully impact with and pass through each of a plurality of successive bodies of travertine, and effecting said forceful impact by causing the mine water to fall by gravity prior to contact with each body of travertine a distance adequate to create sufficient force to effect a continuous eroding action at the surface of the travertine.

4. A process for treating acidified mine water comprising causing the mine water to move in a plurality of successive water falls and to forcefully contact in each fall with a body of porous calcium carbonate.

5. A process for treating acidified mine water comprising causing the mine water to move in a plurality of successive water falls and to forcefully contact in each fall with a substantially conically-shaped body of porous calcium carbonate at or near the apex thereof.

6. A process for treating acidified mine water comprising causing the mine water to move in a plurality of successive water falls and to forcefully contact in each fall with a body of porous calcium carbonate and causing the mine water subsequent to movement in said water falls to acquire a quiescent condition to permit the oxidized iron salts to precipitate.

7. An apparatus for treating acidified mine water comprising a plurality of successive treating chambers for containing travertine, means for so introducing the mine water to the first chamber and to each succeeding chamber as to cause the water to move in successive water falls, each fall being of a distance adequate to create sufficient hydrostatic pressure to cause an erosion of the travertine in the receiving chamber, a settling zone, and means for delivering the water from the last treating chamber to said settling zone.

JOHN T. TRAVERS.